US006344935B1

(12) United States Patent
Maruyama

(10) Patent No.: US 6,344,935 B1
(45) Date of Patent: Feb. 5, 2002

(54) OPTICAL SYSTEM OF OPTICAL PICK-UP

(75) Inventor: Koichi Maruyama, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,576

(22) Filed: Mar. 2, 2000

(30) Foreign Application Priority Data

Mar. 8, 1999 (JP) .......................................... 11-060809

(51) Int. Cl.[7] ................................................. G02B 3/00
(52) U.S. Cl. ....................... 359/722; 359/719; 359/721; 369/112.26
(58) Field of Search .................. 369/112.26, 112.13, 369/112.08, 44.14; 359/722, 719, 724, 721

(56) References Cited

U.S. PATENT DOCUMENTS

| 5,696,750 A | 12/1997 | Katayama .................... 369/112 |
| 6,043,912 A | 3/2000 | Yoo et al. ...................... 359/19 |
| 6,061,324 A | 5/2000 | Arai et al. ................... 369/112 |
| 6,088,322 A | * 7/2000 | Broome et al. ............. 369/112 |
| 6,134,055 A | * 10/2000 | Koike ........................ 359/724 |

FOREIGN PATENT DOCUMENTS

| EP | 0747893 | 12/1996 |
| EP | 0838812 | 4/1998 |
| NL | 1008739 | 9/1998 |

* cited by examiner

Primary Examiner—Georgia Epps
Assistant Examiner—Timothy J Thompson
(74) Attorney, Agent, or Firm—Greenblum & Bernstein, P.L.C.

(57) ABSTRACT

An optical system of an optical pick-up that is capable of using optical discs DVD and CD. The system includes a light source portion for selectively emitting a first laser beam (650 nm) and a second laser beam (780 nm), and an objective lens for converging the laser beam from the light source portion onto an recording layer of the optical disc. The objective lens is provided with a transmittance controlling phase grating in a peripheral region to have a wavelength dependence such that the transmittance for the first laser beam is higher than the transmittance for the second laser beam. The transmittance controlling phase grating is formed as a plurality of concentric grooves. Each of the grooves has a rectangular cross-section in a plane containing an optical axis of the objective lens.

11 Claims, 8 Drawing Sheets

SPHERICAL ABERRATION
SINE CONDITION

ASTIGMATISM

SPHERICAL ABERRATION
SINE CONDITION

ASTIGMATISM

SPHERICAL ABERRATION
SINE CONDITION

ASTIGMATISM

SPHERICAL ABERRATION
SINE CONDITION

ASTIGMATISM

OPTICAL SYSTEM OF OPTICAL PICK-UP

BACKGROUND OF THE INVENTION

The present invention relates to an optical system for an optical pick-up that is capable of using two kinds of optical discs having different recording densities.

In general, diameter of a beam spot formed on a recording layer of an optical disc is closely related to the recording density of the optical disc. That is, the spot diameter is required to have a suitable size for appropriately covering a track on the recording layer in width. The disc with higher recording density has narrower track width, which requires a smaller spot size. On the contrary, the disc with lower recording density has wider track width, which requires a larger spot size.

When the spot diameter is much larger than the track width, reproduced signal may include jitter, which is undesirable effect of the reflected light from adjacent tracks on the reproduced signal. On the other hand, when the spot diameter is much smaller than the track width, particularly for an optical system that reproduces the recorded signal from an optical disc such as a compact disc (CD) through the use of diffraction of light, the system may miss reproducing the signal due to insufficient diffraction.

Since the spot diameter becomes smaller as a wavelength of light becomes shorter and numerical aperture (NA) becomes larger, the optical system for a digital versatile disc (DVD) with high recording density requires shorter wavelength and higher NA, and the optical disc for the CD with low recording density requires longer wavelength and lower NA.

A conventional optical pick-up that is compatible between the CD and the DVD is provided with a pair of optical systems that are specifically designed for the CD and the DVD, respectively. However, such an optical pick-up increases the total size of the device and increases manufacturing cost.

An another conventional optical pick-up is provided with a pair of semiconductor lasers whose emission wavelength are different to each other, an optical system including an objective lens that is common for the CD and the DVD and an aperture mechanism to change NA in response to the type of the disc. However, when the aperture mechanism is mounted on a movable portion that is driven for a tracking servo, the weight of the movable portion increases, which lowers a tracking response.

On the other hand, when the aperture mechanism is mounted on other than the movable portion, and particularly when the aperture limits the beam diameter to be small, the incident light quantity on the objective lens varies due to the tracking movement of the objective lens, which varies a level of the reproducing signal. That is, since the diameter of the incident laser beam into the objective lens is larger than the diameter of the objective lens in general, the tracking movement of the objective lens within the beam diameter does not change the incident light quantity. However, when the Incident laser beam is limited by the aperture, a part of the objective lens may go out of the laser beam due to the tracking movement, which varies the incident light quantity.

SUMMARY OF THE INVENTION

It is therefore an object of the present invention to provide an optical system of an optical pick-up, which is a capable of adjusting the beam spot size in accordance with the recording density of the optical disc without using the aperture mechanism.

For the above object, according to the present invention, there is provided an improved optical system of an optical pick-up that is capable of using at least two types of optical discs having different recording density, which includes:

a light source portion for selectively emitting a first laser beam having relatively short wavelength and a second laser beam having relatively long wavelength; and an objective lens for converging the laser beam from the light source portion onto a recording layer of the optical disc, the objective lens being provided with a transmittance controlling phase grating in a peripheral region to have a wavelength dependence such that the transmittance for the first laser beam is higher than the transmittance for the second laser beam.

The transmittance controlling phase grating is formed as a plurality of concentric grooves. Each of the grooves has a rectangular cross-section in a plane containing an optical axis of the objective lens. Namely, side walls of the grooves are substantially parallel to the optical axis, recessed surfaces of the grooves and protuberant surfaces between the grooves are substantially coincident with the macroscopic shape of the lens surface, respectively. The peripheral region is outside of the transmitting region of the laser beam having a predetermined NA required for the optical disk having lower recording density. It should be noted that the "transmittance" is defined as a ratio of the light quantity of the laser beam that forms a beam spot together with the light beam passing through the central region inside the peripheral region to the light quantity of the laser beam that is incident on the peripheral region.

When the optical disc having higher recording density is used, the light source portion emits the first laser beam having shorter wavelength. Since the transmittance controlling phase grating has higher transmittance for the first laser beam, the first laser beam passes not only the central region but also the peripheral region of the objective lens. As a result, an NA of the objective lens for the first laser beam becomes relatively high, which reduces the size of the beam spot on the optical disc.

When the optical disc having lower recording density is used, the light source portion emits the second laser beam having longer wavelength. Since the transmittance controlling phase grating has lower transmittance for the second laser beam, it cuts off the second laser beam and the second laser beam mainly passes the central region of the objective lens. As a result, the NA of the objective lens for the second laser beam becomes relatively low, which enlarges the size of the beam spot on the optical disc.

In the specification, the objective lens is defined as a lens having at least converging function and transmittance controlling function, irrespective of number of lens element. That is, the objective lens maybe a single lens or a combination of a plurality of elements. Further, the transmittance controlling function may be separated from the converging function. The objective lens may be a combination of a converging lens and a flat plate having the transmittance controlling phase grating.

It is preferable that the transmittance controlling phase grating gives optical path difference that is equal to "p" times (p is integer) of the wavelength of the first laser beam and that is equal to "q+0.5" a times (q is integer) of the wavelength of the second laser beam. For instance, p=3 and q=2.

Further, the light source portion may be designed such that the first and second laser beams satisfy the following condition (1);

$$0.81 < \lambda 1/\lambda 2 < 0.85 \tag{1}$$

where

λ1 is the wavelength of the first laser beam, and

λ2 is the wavelength of the second laser beam.

Still further, the transmittance controlling phase grating is preferably formed such that a duty ratio is not 1:1. The duty ratio is defined as a ratio of a width R1 of the recessed surface to a width R2 of the adjacent protuberant surface in the radial direction. More specifically, it is preferable that one of the following conditions (2) and (3) is satisfied in at least one pair of the recessed surface and the adjacent protuberant surface;

$$1.2 < R1/R2 < 3.0 \tag{2}$$

$$1.2 < R2/R1 < 3.0 \tag{3}$$

Preferably, the duty ratio R1/R2 varies depending on a position in a radial direction in the peripheral region. For instance, an absolute difference |R1−R2| may decrease towards the outer side from the inner side in the peripheral region. The transmittance controlling phase grating may satisfy R1<R2 in at least one pair of the recessed surface and the adjacent protuberant surface.

The central region inside the peripheral region may be a continuous surface whose cross section along the radial direction is a single curve. In such a case, the light source portion selectively emits the first and second laser beams such that the first laser beam is incident on the objective lens as a parallel beam and the second laser beam is incident on the objective lens as a divergent beam.

On the other hand, a diffractive lens structure may be formed in the central region. The diffractive lens structure is formed as a plurality of concentric rings each of which has a wedge cross section to have wavelength dependence such that spherical aberration varies in the under corrected direction as wavelength of incident light increases. In such a case, the light source portion selectively emits the first and second laser beams such that the first and second laser beams are incident on the objective lens as parallel beams.

DESCRIPTION OF THE ACCOMPANYING DRAWINGS

DESCRIPTION OF THE EMBODIMENTS

First Embodiment

Figure 1:
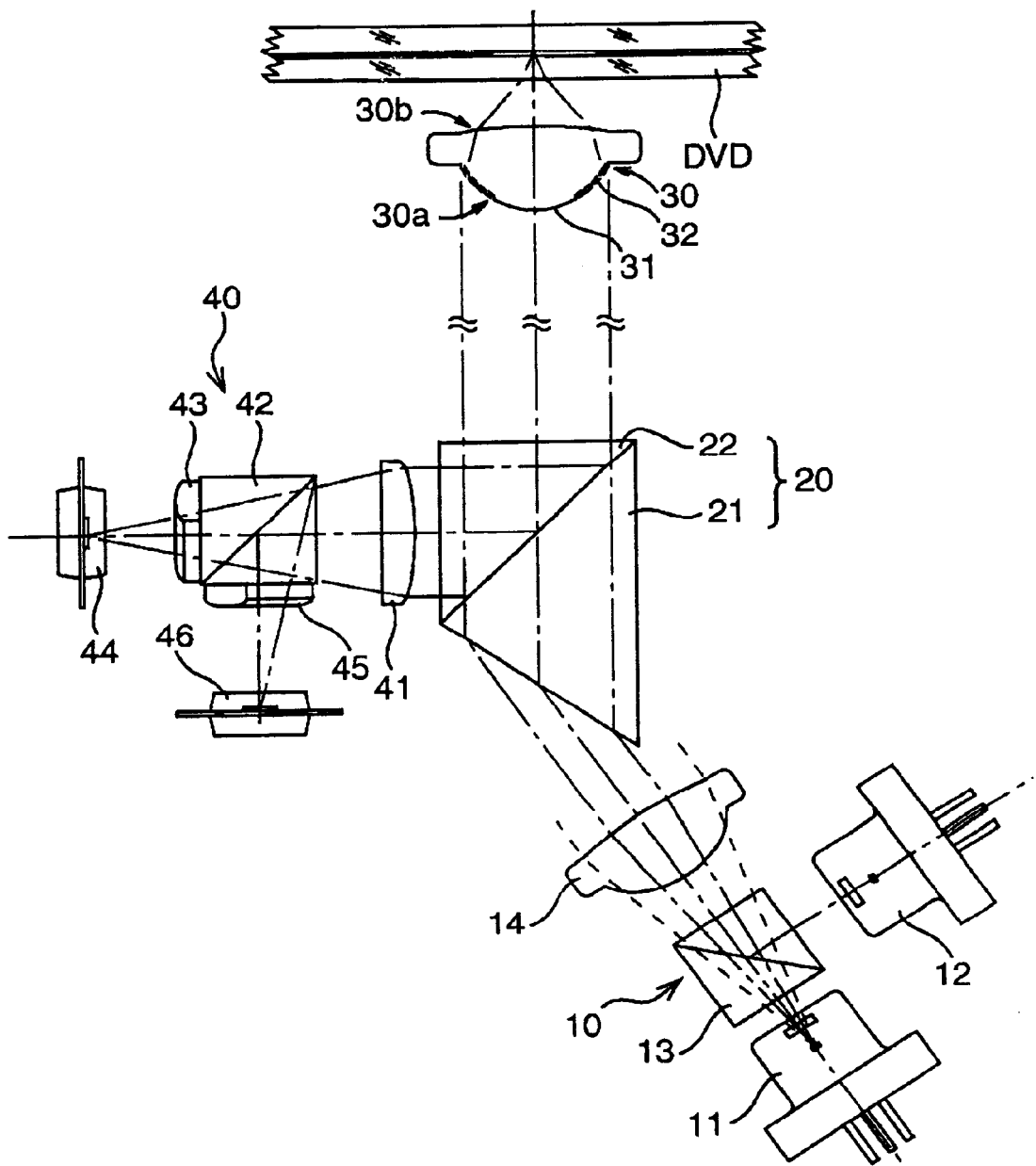
FIG. 1 shows an optical system of the optical pick-up according to a first embodiment with a DVD.
Figure 2:
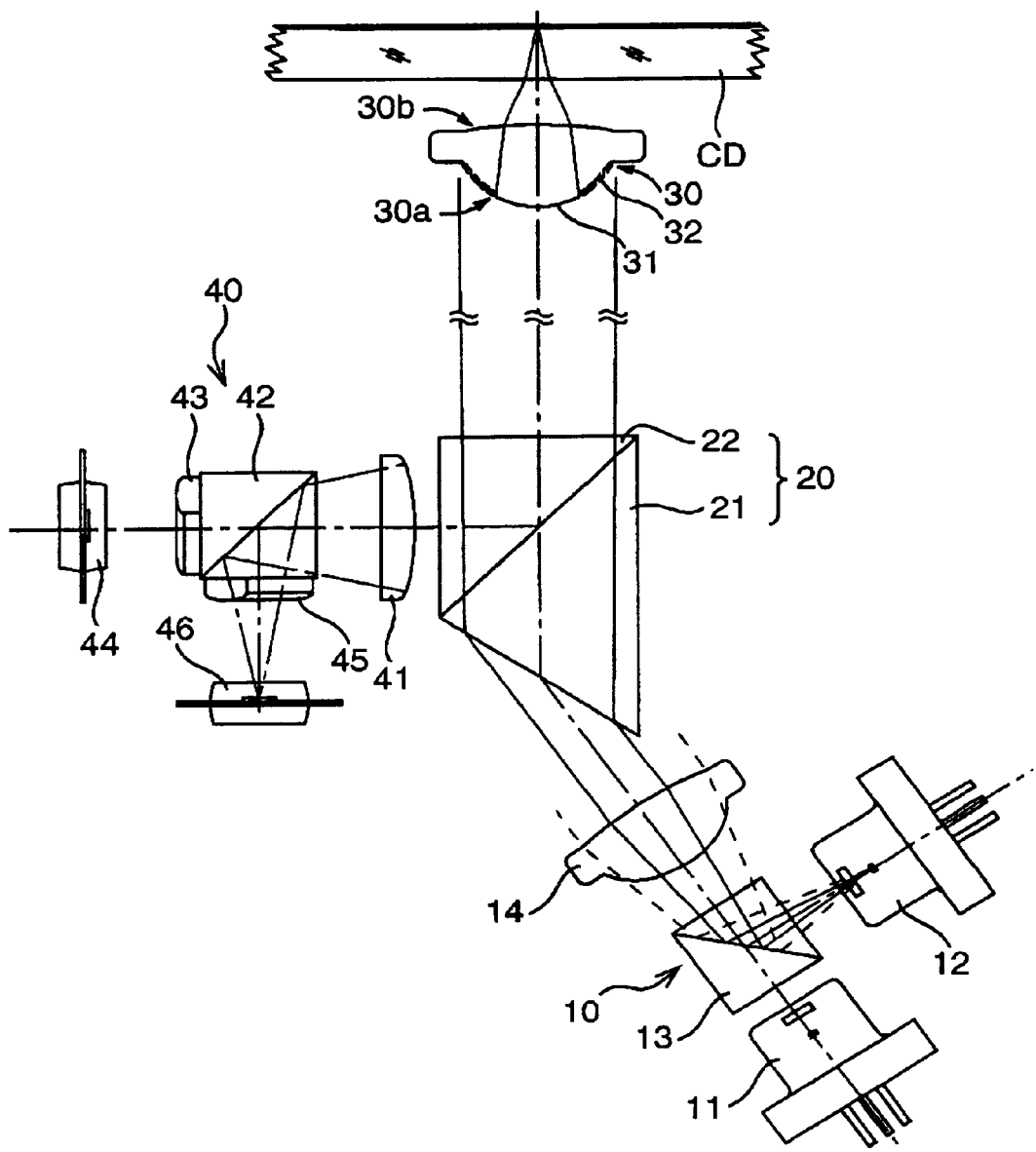
FIG. 2 shows the optical system of the optical pick-up according to the first embodiment with a CD.
Figure 3A:
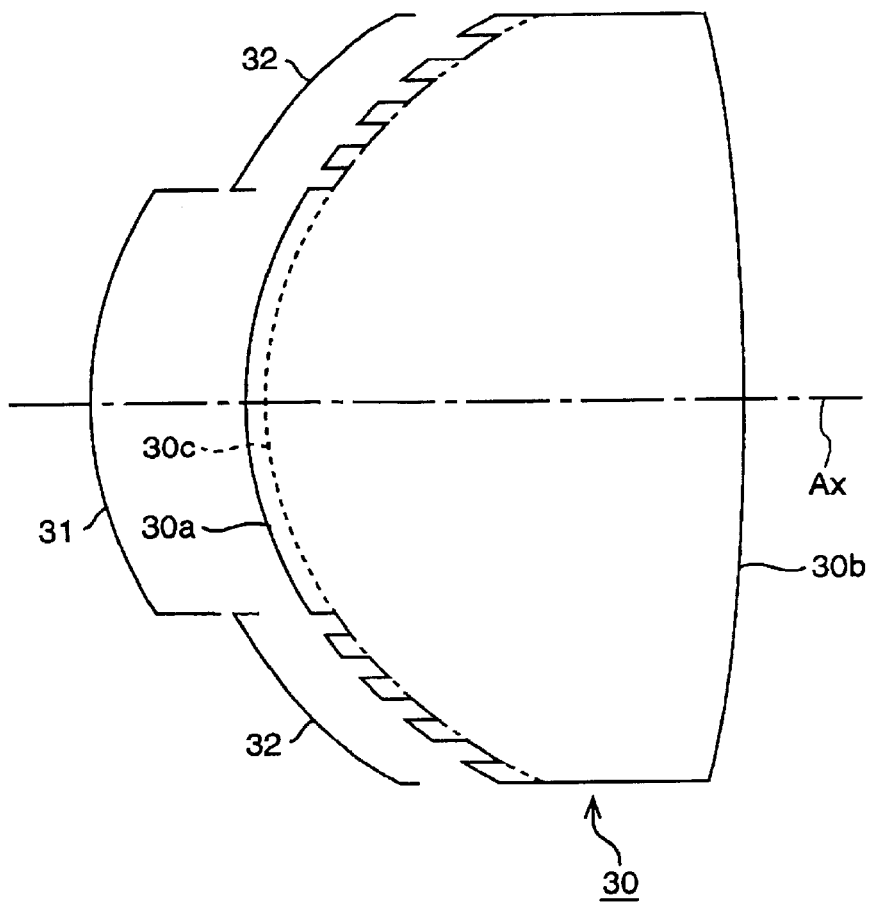
FIG. 3A is a cross-sectional view of the objective lens in the optical system according to the first embodiment.

FIGS. 1 and 2 show an optical system of the optical pick-up according to a first embodiment. The optical pick-up is applied to an optical disc apparatus that is capable of recording/reproducing the DVD whose recording density is relatively high and the CD whose recording density is relatively low. The optical system records/reproduces signals into/from the DVD as shown in FIG. 1, and it reproduces signal from the CD as shown in FIG. 2. FIG. 3A is a cross-sectional view of the objective lens used In the optical system of FIGS. 1 and 2.

As shown in FIGS. 1 and 2, the optical system includes a light source portion 10, a beam shaping/separating prism 20, an objective lens 30 and a light receiving portion 40. The light source portion 10 is provided with a first semiconductor laser 11 that emits a first laser beam having relatively short wavelength when the DVD is used, a second semiconductor laser 12 that emits a second laser beam having relatively long wavelength when the CD is used, a polarizing beam splitter 13 and a collimator lens 14. The light source portion 10 selectively emits the first laser beam and the second laser beam.

The first semiconductor laser 11 is arranged such that the first laser beam Is Incident on the polarizing beam splitter 13 as a P-polarized light, and the second semiconductor laser 12 is arranged such that the second laser beam is incident on the polarizing beam splitter 13 as an S-polarized light.

The collimator lens 14 is a single piece positive lens that has refractive power to convert the divergent beam from the first semiconductor laser 11 into a parallel beam. The first laser beam from the first semiconductor laser 11 is incident on the objective lens 30 as a parallel beam as shown in FIG. 1. On the other hand, the second laser beam from the second semiconductor laser 12 is incident on the objective lens as a divergent beam as shown in FIG. 2.

The beam shaping/separating prism 20, which is composed of a pair of prisms 21 and 22, shapes cross sections of the laser beams and reflects the reflected beam from the optical disc DVD or CD to be incident on the light receiving portion 40.

The objective lens 30, which is made from plastic such as PMMA, is a single piece lens whose first and second lens surfaces 30a and 30b are aspherical. The objective lens 30 converges the laser beam from the light source portion 10 onto a recording layer of the optical disc DVD or CD. A transmittance controlling phase grating 32 is formed in a peripheral region of the first surface 30a, and a central region is formed as a continuous surface 31 whose cross section along the radial direction is a single curve.

The light receiving portion 40 includes a condenser lens 41 to converge the reflected light beam from the beam shaping/separating prism 20, a polarizing beam splitter 42, a pair of cylindrical lenses 43 and 45, and a pair of photodetectors 44 and 46. The first laser beam reflected from the optical disc passes through the polarizing beam splitter 42 and the cylindrical lens 43 to be incident on the first photodetector 44. The second laser beam reflected from the optical disc is reflected by the polarizing beam splitter 42 and passes through the cylindrical lens 45 to be incident on the second photodetector 46.

Figure 3B:
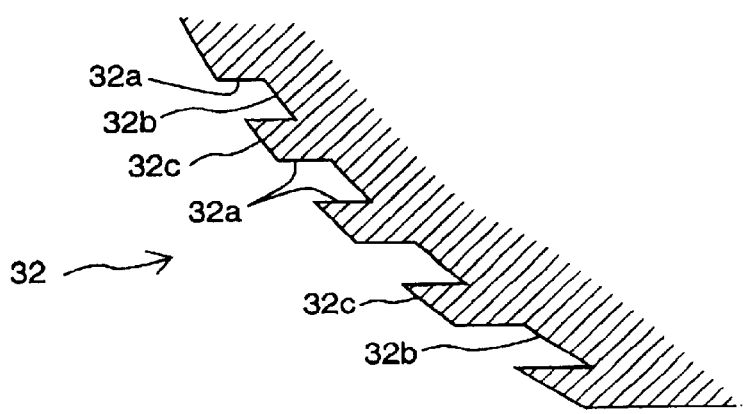
FIG. 3B is an enlarged view of a peripheral region of the objective lens in FIG. 3A.

A detail of the objective lens 30 will be described with reference to FIGS. 3A and 3B. FIG. 3A is a cross-sectional view of the objective lens 30 and FIG. 3B is an enlarged view of the peripheral region. The transmittance controlling phase grating 32 in the peripheral region is formed as a plurality of concentric grooves and has a wavelength dependence such that the transmittance for the first laser beam is higher than the transmittance for the second laser beam. Each of the grooves has a rectangular cross-section in a plane containing an optical axis Ax of the objective lens 30. Namely, side walls 32a of the grooves are substantially parallel to the optical axis Ax, recessed surfaces 32b of the grooves and protuberant surfaces 32c between the grooves are substantially coincident with the macroscopic shape of the lens surface, respectively. The first surface 30a is defined as a virtual surface that contains the protuberant surfaces 32c. Further, an intermediate surface 30c is defined as a virtual surface that contains the recessed surfaces 32b as shown by a dotted line in FIG. 3A. In the first embodiment, the continuous surface 31 in the central region is coincident with the first surface 30a. However, the continuous surface 31 may be coincident with the intermediate surface 30c. It should be noted that FIG. 3A emphasizes the grooves as compared with the actual construction. A larger number of finer grooves are formed in the actual construction.

Since the transmittance controlling phase grating 32 provides higher transmittance for the first laser beam, the first laser beam passes not only the central region but also the peripheral region of the objective lens 30. As a result, an NA of the objective lens 30 for the first laser beam becomes relatively high, which forms the small beam spot that is suitable for the DVD.

Since the transmittance controlling phase grating 32 cuts off the second laser beam, the second laser beam passes the central region only. As a result, the NA of the objective lens for the second laser beam becomes relatively low, which forms the large beam spot that is suitable for the CD.

The peripheral region is outside of the transmitting region of the laser beam having a predetermined NA required for the optical disk having lower recording density. Since the NA required for the CD is about 0.45, the peripheral region is defined as outside of the transmitting region of the laser beam having NA=0.45, for example.

The transmittance controlling phase grating 32 gives optical path difference that is equal to "p" times (p is integer) of the wavelength of the first laser beam and that is equal to "q+0.5" times (q is integer) of the wavelength of the second laser beam. When the optical path difference is an integral multiple of the wavelength, an optical function of the phase grating 32 is the same as a flat surface without grooves, the laser beam passes with high transmittance. On the other hand, when the optical path difference is "integer+0.5" times of the wavelength, the laser beam through the recessed surface 32b counteracts the laser beam through the protuberant surface 32c, which lowers the transmittance.

Requirements for the transmittance controlling phase grating 32 are listed as follows:

(a) To maximize the transmittance of the first laser beam as a zero order diffraction light (non-diffraction light);
(b) to minimize the transmittance of the second laser beam as a zero order diffraction light; and
(c) to minimize the incident light quantity of the second laser beam that is diffracted by the transmittance controlling phase grating 32 and is incident on the photodetectors 44 and 46.

Regarding the diffraction by the transmittance controlling phase grating 32, when the diffractive order of the second laser beam that is incident on the optical disc is an opposite number (number with an opposite sign but the same absolute value) of the diffractive order of the second laser beam that is reflected from the optical disc toward the photodetector, the diffraction laser beam travels along the same optical path as the non-diffraction laser beam and then reaches the photodetector. For instance, when the incident laser beam is diffracted at −1st order and the reflected laser beam is diffracted at +1st order, the diffraction laser beam travels along the same optical path as the non-diffraction laser beam. Since the diffraction laser beam is dispersed over a too large area on the optical disc to reproduce the recorded signal, the intensity of the reflected beam corresponds to averaged intensity among many recorded signals and it is almost constant. The constant component gives a DC offset to the reproducing signal and lowers an S/N ratio. Therefore, it is important to satisfy not only the requirements (a) and (b) but also (c).

The large positional difference between the recessed surface 32b and the protuberant surface 32c along the optical axis direction reduces the transmittance due to increasing of diffraction loss, even if the optical path difference is an integral multiple of the wavelength. Thus, the difference between the recessed surface and the protuberant surface should be small as possible to satisfy the requirement (a) and to ease manufacturing. That is, it is preferable that the values "p" and "q" are small as possible. There is a necessity to differ wavelength $\lambda 1$ of the first laser beam from wavelength $\lambda 2$ of the second laser beam for some amount in order to minimize the values "p" and "q". Preferably, the wavelengths $\lambda 1$ and $\lambda 2$ satisfy the following condition (1):

$$0.81 < \lambda 1 / \lambda 2 < 0.85 \tag{1}$$

In consideration of a practical selection of semiconductor lasers, when the first wavelength $\lambda 1$ is 650 nm and the second wavelength $\lambda 2$ is 780 nm, the condition (1) is satisfied ($\lambda 1/\lambda 2=0.833$) and the optical path difference is 1.95 $\mu$m when p=3 and q=2. In such a case, the positional difference between the recessed surface and the protuberant surface along the optical axis direction becomes 3.90 $\mu$m when the lens whose refractive index is 1.5 is used in air.

It is preferable that a ratio of a width R1 of the recessed surface to a width R2 of the adjacent protuberant surface is close to 1:1 to satisfy the requirement (b). The ratio R1/R2 is defined as a duty ratio.

On the other hand, it is preferable that the duty ratio R1:R2 is not 1:1 to satisfy the requirement (c). Therefore, it is necessary to find a point of compromise between the requirements (b) and (c) that are incompatible with each other. The following TABLE 1 shows relationship between a variation of the duty ratio R1:R2 and diffraction efficiencies of the second laser beam when the optical path difference is equal to a half wavelength. The diffraction efficiency is a ratio of the diffraction light quantity to the incident light quantity expressed by percentage.

TABLE 1

| Diffr-action Order | Duty ratio | | | | | |
|---|---|---|---|---|---|---|
| | 0.5:0.5 | 0.45:0.55 | 0.4:0.6 | 0.35:0.65 | 0.3:0.7 | 0.25:0.75 |
| 0 | 0.0% | 1.0 | 4.0 | 9.0 | 16.0 | 25.0 |
| ±1 | 40.5% | 39.5 | 36.7 | 32.2 | 26.5 | 20.3 |
| ±2 | 0.0% | 1.0 | 3.5 | 6.6 | 9.2 | 10.1 |
| ±3 | 4.5% | 3.6 | 1.6 | 0.1 | 0.4 | 2.2 |
| ±4 | 0.0% | 0.9 | 2.3 | 2.3 | 0.9 | 0.0 |
| ±5 | 1.6% | 0.8 | 0.0 | 0.& | 1.6 | 0.8 |

When the dutyratiois 0.5:0.5, the zero order diffraction light (non-diffracted light) is 0.0%, the beam spot does not becomes too small for the CD. However, 81% of the second laser beam incident on the transmittance controlling phase grating 32 becomes ±1st order diffraction light that spreads over a circle whose diameter is about 100 $\mu$m. The sum of the quantity of the noise laser beam diffracted at +1st order toward the optical disc and at −1st order toward the photodetector, and the quantity of the noise laser beam diffracted at −1st order toward the optical disc and at +1st order toward the photodetector, is equal to about 33% of the incident light quantity in an amplitude value.

On the other hand, when the duty ratio is 0.25:0.75 or 0.75:0.25, the diffractive efficiency of the zero order diffraction light becomes 25%. In such a case, 50% (in the amplitude value) of the second laser beam incident on the transmittance controlling phase grating 32 is converged to form the beam spot on the optical disc, the beam spot formed by the second laser beam becomes too small for the CD. The quantity of the noise laser beam that is diffracted at the predetermined order toward the optical disk and is diffracted at the order of the opposite number toward the photodetector becomes about 10%.

Therefore, the transmittance controlling phase grating 32 is designed such that one of the following conditions (2) and (3) is satisfied in at least one pair of the recessed surface and the adjacent protuberant surface to compromise the requirements (b) and (c). The condition (2) or (3) is preferably satisfied in an inner half region of the peripheral region.

$$1.2 < R1/R2 < 3.0 \qquad (2)$$

$$1.2 < R2/R1 < 3.0 \qquad (3)$$

When the duty ratio R1/R2 or its reciprocal number R2/R1 is smaller than 1.2. light quantity of the noise laser beam becomes too large, which violates the requirement (c). Contrarily, when the ratio is larger than 3.0, the zero order diffraction light of the second laser beam exceeds 50% in the amplitude value, which violates the requirement (b). That is, the beam spot becomes too small for the CD.

Further, the duty ratio R1/R2 may be constant in the entire region of the peripheral region, while it is preferable that the duty ratio R1/R2 varies depending on a position in a radial direction in the peripheral region in order to find a better point of compromise between the requirements (b) and (c). The laser beam passing through the outer portion in the peripheral region contributes to reduce the spot size rather than the laser beam passing through the inner portion in the peripheral region. The requirement (b) should be satisfied particularly in the outer portion in the peripheral region in order to avoid too much reduction of the spot size. Therefore, it is preferable that an absolute difference |R1−R2| may decrease towards the outer side from the inner side within the peripheral region.

The transmittance controlling phase grating whose duty ratio R1:R2 equals x:y has the same optical performance as the phase grating whose duty ratio R1:R2 equals y:x. Further, when the mold is manufactured by a precision lathe and the objective lens is made as a replica using the mold, the wider the depression of the mold is, the easier the manufacturing of the mold is. The width of the depression of the mold corresponds to the width R2 of the protuberant surface of the lens. Therefore, it is preferable that the condition R1<R2 is satisfied in the peripheral region, particularly in the outer portion thereof, to eases manufacturing of the mold.

The DVD and the CD are different to each other not only in the recording density but also in a thickness of a cover layer. The cover layer of the CD has the thickness of 1.2 mm, and the thickness of the cover layer of the DVD is 0.6 mm. The displacement of the recording layer due to the difference of the cover layers can be compensated by a auto-focusing mechanism provided in the optical pick-up.

Although a paraxial beam spot moves as the objective lens is moved, the change of the thickness of the cover layer changes spherical aberration. If the optical pick-up only moves the objective lens when the disc Is replaced, wave front aberration of the laser beam is deteriorated. Since the objective lens 30 is designed to minimize the spherical aberration for the DVD, the spherical aberration will be overcorrected when the objective lens 30 is used for the CD under the same condition. Therefore, the optical pick-up of the first embodiment changes the convergence of the laser beam incident on the objective lens 30. That is, the first laser beam is incident on the objective lens 30 as a parallel beam, while the second laser beam is incident on the objective lens as a divergent beam. The larger the divergence of the light is, the greater the spherical aberration in an under-corrected direction is. Therefore, the under-corrected spherical aberration due to the divergent laser beam cancels the overcorrected spherical aberration caused by the cover layer of the CD.

Second Embodiment

Figure 4:
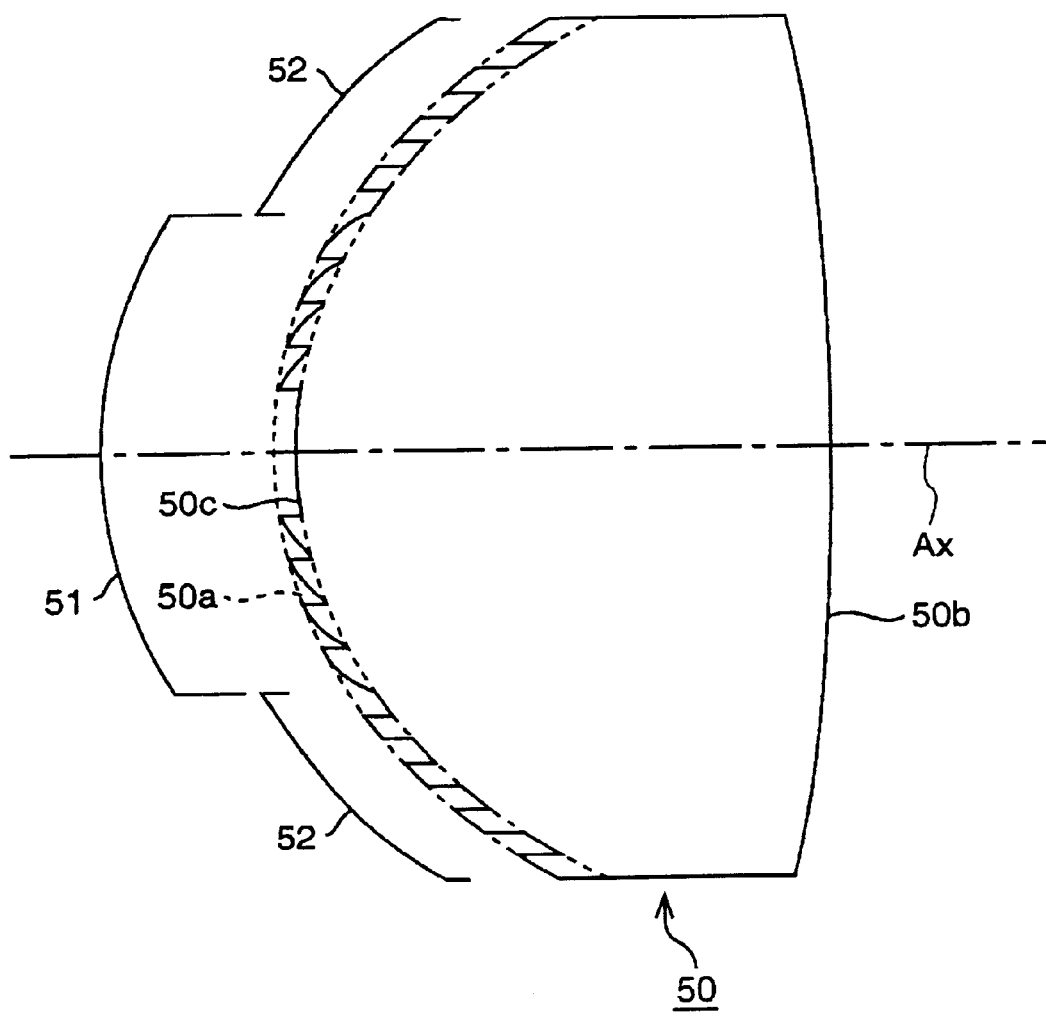
FIG. 4 is a cross-sectional view of an objective lens in an optical system according to a second embodiment.

FIG. 4 shows an objective lens 50 according to the second embodiment. For the purpose of the spherical aberration correction, a diffractive lens structure may be formed in the central region. The diffractive lens structure has wavelength dependence such that spherical aberration varies in the undercorrected direction as wavelength of incident light increases. The objective lens 50 is provided with a transmittance controlling phase grating 52 in the peripheral region as with the objective lens 30, and the diffractive lens structure 51 that is formed as a plurality of concentric rings each of which has a wedge cross section in a plane containing an optical axis. When the optical pick-up adopts the objective lens 50, the light source portion 10 selectively emits the first and second laser beams such that the first and second laser beams are incident on the objective lens 50 as parallel beams.

Numerical examples that correspond to the objective lenses 30 and 50 shown in FIGS. 3 and 4 will be described hereinafter.

First Example

Figure 5:
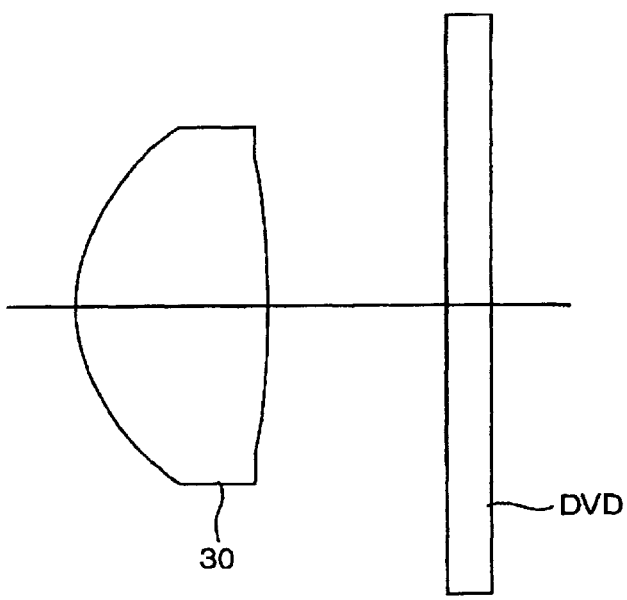
FIG. 5 is a lens diagram of an objective lens according to a first numerical example with the DVD.
Figure 7:
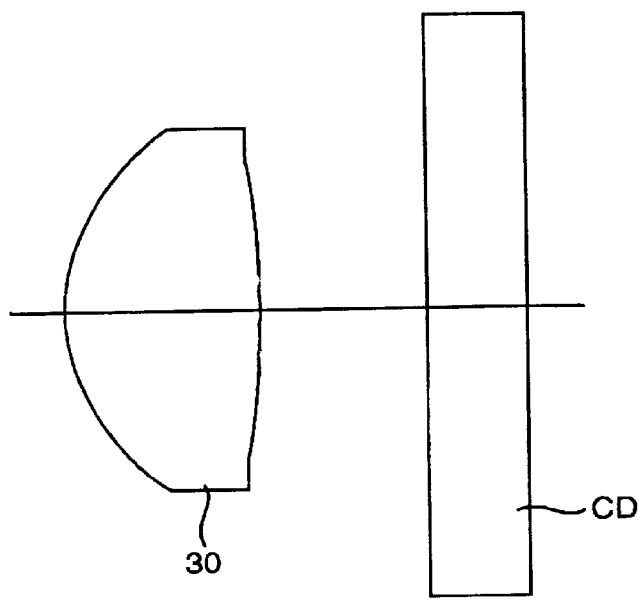
FIG. 7 is a lens diagram of the objective lens according to the first numerical example with the CD.

The objective lens of the first example corresponds to FIG. 3. The transmittance controlling phase grating is formed in the peripheral region of the first surface, and the central region inside the peripheral region is formed as the continuous refractive surface without grooves. FIG. 5 is a lens diagram of an objective lens 30 according to the first example with the DVD. FIG. 7 shows the objective lens 30 with the CD. It should be noted that the phase grating is not shown in the lens diagram.

The numerical constructions thereof are described in TABLE 2. The surfaces #1 and #2 represent the objective lens 30 and the surfaces #3 and #4 represent the cover layer of the optical disc. The surface M represents the intermediate surface 30c (see FIG. 3A).

In TABLE 2, $\lambda_1$ (unit:nm) denotes the wavelength of the first laser beam for the DVD, $\lambda_2$ (unit:nm) denotes the wavelength of the second laser beam for the CD, $f_1$ (unit:mm) denotes the total focal length when the DVD is used, $f_2$ (unit:mm) denotes the total focal length when the CD is used, $M_1$ denotes magnification when the DVD is used, $M_2$ denotes magnification when the CD is used, r (unit:mm) denotes a radius of curvature of a lens surface (the values at the vertex for aspherical surfaces), d (unit:mm) denotes a distance between the surfaces along the optical axis, $n\lambda$ denotes a refractive index at a wavelength $\lambda$ nm and vd denotes an Abbe number. For the d2 and d3, left values are valid when the DVD is used, right values are valid when the CD is used.

When the DVD is used, the first laser beam is incident on the objective lens 30 as a parallel beam, an object point is located at an infinite distance from the first surface of the objective lens 30. On the other hand, when the CD is used, the second laser beam is incident on the objective lens 30 as a divergent beam, the object distance from the first surface to the object point is −84.0 mm.

All of the first surface 30a (surface #1), the intermediate surface 30c (surface M) and the second surface 30b (surface #2) of the objective lens 30 are rotationally symmetrical aspherical surfaces. The rotationally symmetrical aspherical surface is expressed by the following equation:

$$X(h) = \frac{h^2 c}{1 + \sqrt{1-(1+K)h^2 c^2}} + A_4 h^4 + A_6 h^6 + A_8 h^8 + A_{10} h^{10} + A_{12} h^{12} + \Delta$$

X(h) is a SAG, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$, $A_{12}$ and $\Delta$ are aspherical surface coefficients of fourth, sixth, eighth, tenth, twelfth and zero orders, respectively. The constant K and coefficients $A_4$ through $A_{12}$ and $\Delta$ are shown in the following TABLE 3.

TABLE 2

| | $\lambda 1$ = 650 nm | f1 = 4.00 mm | M1 = 0.0 | | |
| | $\lambda 2$ = 780 nm | f2 = 4.03 mm | M2 = −0.050 | | |
| Surface Number | r | d | n650 | n780 | v |
|---|---|---|---|---|---|
| #1 | 2.49626 | 0.00361 | | | |
| M | 2.49500 | 2.40000 | 1.54082 | 1.53677 | 55.6 |
| #2 | −10.78900 | 2.270/2.115 | | | |
| #3 | ∞ | 0.600/1.200 | 1.58030 | 1.57346 | 29.9 |
| #4 | ∞ | | | | |

TABLE 3

| | Surface #1 | Surface M | Surface #2 |
|---|---|---|---|
| r | 2.49626 | 2.49500 | −10.78900 |
| κ | −0.440 | −0.440 | 0.000 |
| A4 | −5.865 × 10$^{-4}$ | −5.867 × 10$^{-4}$ | 7.378 × 10$^{-3}$ |
| A6 | −2.887 × 10$^{-5}$ | −2.837 × 10$^{-5}$ | −9.690 × 10$^{-4}$ |
| A8 | −2.274 × 10$^{-5}$ | −2.274 × 10$^{-5}$ | 2.830 × 10$^{-5}$ |
| A10 | 3.393 × 10$^{-6}$ | 3.393 × 10$^{-6}$ | 1.500 × 10$^{-6}$ |
| A12 | −8.400 × 10$^{-7}$ | −8.365 × 10$^{-7}$ | 0.000 |
| Δ | 0.000 | 0.000 | 0.000 |

Figure 6A:
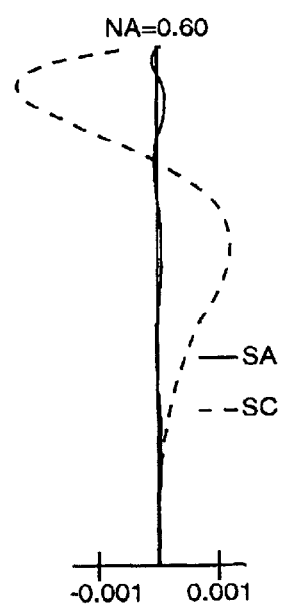
FIG. 6A is a graph showing spherical aberration of the optical system in FIG. 5.
Figure 6B:
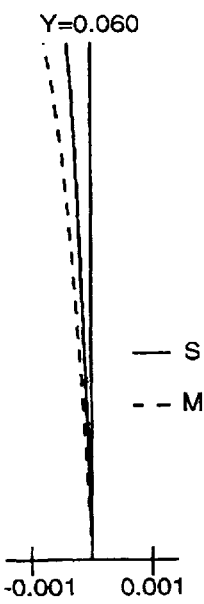
FIG. 6B is a graph showing astigmatism of the optical system in FIG. 5.
Figure 8A:
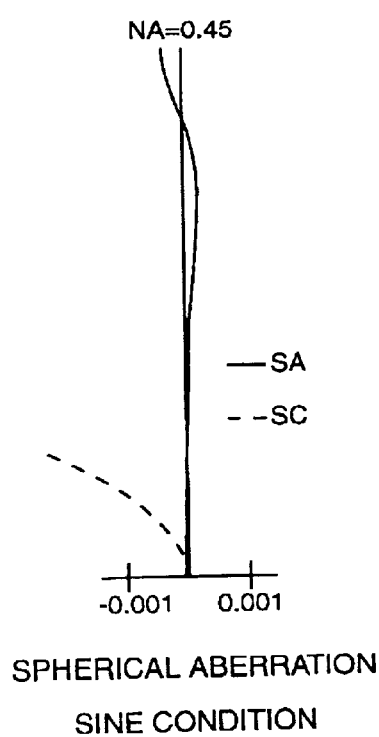
FIG. 8A is a graph showing spherical aberration of the optical system in FIG. 7.
Figure 8B:
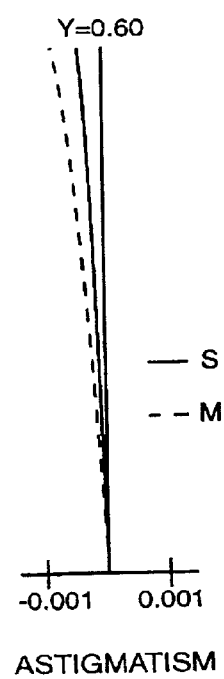
FIG. 8B is a graph showing astigmatism of the optical system in FIG. 7.

FIGS. 6A and 6B show third order aberrations of the objective lens 30 according to the first example when the DVD is used at wavelength of 650 nm. FIG. 6A shows spherical aberration SA and sine condition SC, FIG. 6B shows astigmatism (S: Sagittal, M: Meridional). In FIGS. 6A and 6B, the vertical axes represent numerical aperture NA and the horizontal axis represent amount of aberration. Units of the axes are "mm". FIGS. 8A and 8B show the spherical aberration and the astigmatism of the objective lens 30 when the CD Is used at wavelength of 780 nm.

TABLE 4 shows the construction of the transmittance controlling phase grating 32 when the duty ratio R1:R2 equals 0.5:0.5. Numerical values in TABLE 4 represent the distance h from the optical axis. In TABLE 4, the distance h represents a radius of a circle that is boundary between the recessed surface 32b and the protuberant surface 32c. Each of concentric rings of the recessed surfaces 32b and the protuberant surfaces 32c are defined by the radius of the inner boundary circle and the radius of the outer boundary circle. TABLE 4 shows the range of radii of the inner and outer boundary circles for each of the recessed surfaces 32b and the protuberant surfaces 32c.

TABLE 4

| Protuberant Surface | Hollow Surface |
|---|---|
| 1.872–1.901 | (0.000–1.872) |
| 1.930–1.958 | 1.901–1.930 |
| 1.986–2.013 | 1.958–1.986 |
| 2.039–2.066 | 2.013–2.039 |
| 2.091–2.117 | 2.066–2.091 |
| 2.142–2.166 | 2.117–2.142 |
| 2.191–2.214 | 2.166–2.191 |
| 2.238–2.261 | 2.214–2.238 |
| 2.284–2.307 | 2.261–2.284 |
| 2.329–2.351 | 2.307–2.329 |
| 2.373–2.400 | 2.351–2.373 |

The intermediate surface 30c contains the recessed surfaces 32b and the first surface 30a contains the protuberant surfaces 32b. For instance, the continuous refractive surface 31 (0.00≦h≦1.872) is contained in the intermediate surface 30c and the next ring (1.872≦h≦1.901) becomes the protuberant surface that is coincident with the first surface 30a. In this respect, the lens of the first example is different from the lens shown in FIG. 3A.

When the duty ratio is 0.5:0.5, the second laser beam (780 nm) does not pass the transmittance controlling phase grating 32 as the zero order diffraction light as described. In this case, the transmittance controlling phase grating 32 can reduce the light amount of the second laser beam with narrow width. Thus, the transmittance controlling phase grating 32 is formed in the peripheral region that is outside of the circle whose radius is about 1.9 mm. This circle corresponds to the central region through which the laser beam having NA 0.45 passes.

When the duty ratio R1:R2 equals 0.7:0.3. the construction of the transmittance controlling phase grating 32 may be designed as the following TABLE 5. In such a case, transmittance of the second laser beam (780 nm) as the zero order diffraction light 16%, the transmittance controlling phase grating 32 requires wider width to sufficiently reduce the light amount of the second laser beam. Thus, the transmittance controlling phase grating 32 is formed in the peripheral region that is outside of the circle whose radius is about 1.6 mm.

TABLE 5

| Protuberant Surface | Hollow Surface |
|---|---|
| (0.000–1.616) | 1.616–1.637 |
| 1.637–1.684 | 1.684–1.704 |
| 1.704–1.752 | 1.752–1.769 |
| 1.769–1.812 | 1.812–1.831 |
| 1.831–1.872 | 1.872–1.890 |
| 1.890–1.930 | 1.930–1.947 |
| 1.947–1.986 | 1.986–2.002 |
| 2.002–2.039 | 2.039–2.055 |
| 2.055–2.091 | 2.091–2.107 |
| 2.107–2.142 | 2.142–2.156 |
| 2.156–2.191 | 2.191–2.205 |
| 2.205–2.238 | 2.238–2.252 |
| 2.252–2.284 | 2.284–2.298 |
| 2.298–2.329 | 2.329–2.343 |
| 2.343–2.373 | 2.373–2.386 |
| 2.386–2.400 | |

In the examples shown in TABLEs 4 and 5, the duty ratio is constant in the entire region of the peripheral region. On the other hand, in the example shown in TABLE 6, an absolute difference |R1−R2| decreases towards the outer side from the inner side in the peripheral region. The duty ratio in the innermost side is 0.7:0.3 and that gradually varies to approach 0.5 : 0.5.

TABLE 6

| Protuberant Surface | Hollow Surface |
|---|---|
| 2.013–2.052 | (0.000–2.013) |
| 2.066–2.104 | 2.052–2.066 |
| 2.117–2.152 | 2.104–2.117 |
| 2.166–2.198 | 2.152–2.166 |
| 2.214–2.243 | 2.198–2.214 |
| 2.261–2.287 | 2.243–2.261 |
| 2.307–2.329 | 2.287–2.307 |
| 2.351–2.373 | 2.329–2.351 |
| | 2.373–2.400 |

Second Example

Figure 9:
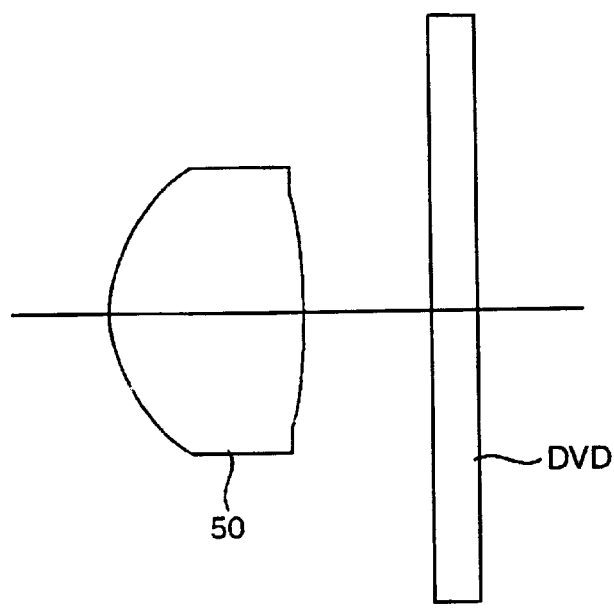
FIG. 9 is a lens diagram of an objective lens according to a second numerical example with the DVD.
Figure 10A:
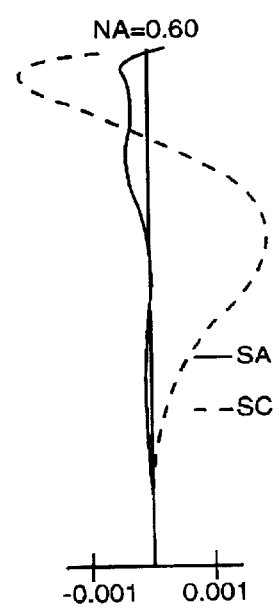
FIG. 10A is a graph showing spherical aberration of the optical system in FIG. 9.
Figure 10B:
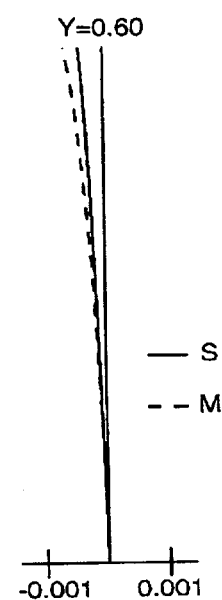
FIG. 10B is a graph showing astigmatism of the optical system in FIG. 9.
Figure 11:
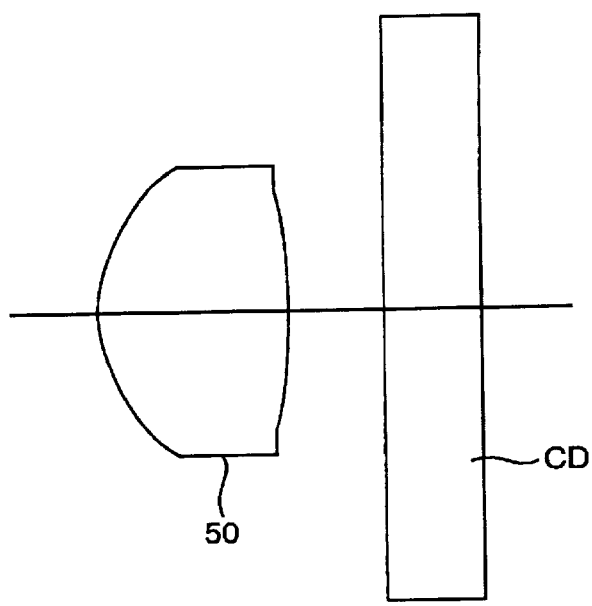
FIG. 11 is a lens diagram of the objective lens according to the second numerical example with the CD.
Figure 12A:
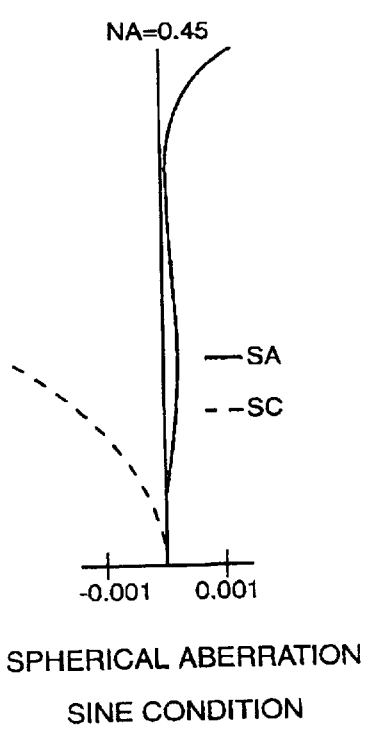
FIG. 12A is a graph showing spherical aberration of the optical system in FIG. 11.
Figure 12B:
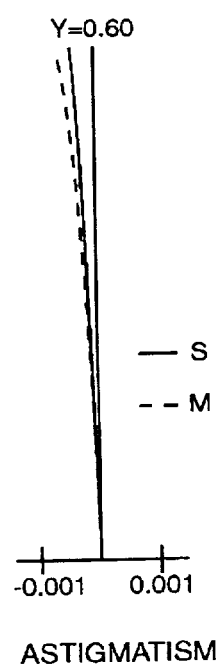
FIG. 12B is a graph showing astigmatism of the optical system in FIG. 11.

The objective lens of the second example corresponds to FIG. 4. The transmittance controlling phase grating 52 is formed in the peripheral region of the first surface, and the diffractive lens structure 51 that compensates the spherical aberration is formed in the central region inside the peripheral region. FIG. 9 is a lens diagram of an objective lens 50 according to the second example with the DVD. FIG. 11 shows the objective lens 50 with the CD. The numerical constructions thereof are described in TABLE 7.

A plurality of concentric rings are formed on the first surface 50a of the objective lens 50. A number N is assigned to each of the concentric rings. The number of the region including the optical axis Ax is "0" and the number increases toward the outside. The rings whose numbers are 0 through 16 are formed as the diffractive lens structure each of which has a wedge cross section in a plane containing the optical axis Ax. The rings whose numbers are larger than 17 are formed as the transmittance controlling phase grating 52.

Since the diffractive lens structure 51 compensates the variation of the spherical aberration due to the change of thickness of the cover layer, the first and second laser beams are incident on the objective lens 50 as parallel beams. It is preferable to compensate chromatic aberration of the collimator lens when the objective lens 50 of the second example is used.

TABLE 8 shows the ranges of the rings whose number is 0 through 16. TABLE 9 shows constants K and coefficients $A_4$ through $A_{12}$ and Δ of a base curve of the first surface 50a (surface #1) within the 16th ring and the second surface 50b (surface #2). The base curve is a macroscopic shape of the surface without diffractive structure.

TABLE 7

| | λ1 = 650 nm | f1 = 3.30 mm | | | |
|---|---|---|---|---|---|
| | λ2 = 780 nm | f2 = 3.32 mm | | | |
| Surface Number | r | d | n650 | n780 | ν |
| #1 | 2.11706 | 2.40000 | 1.54082 | 1.53677 | 55.6 |
| #2 | −7.254 | 1.592/1.222 | | | |
| #3 | ∞ | 0.600/1.200 | 1.58030 | 1.57346 | 29.9 |
| #4 | ∞ | | | | |

TABLE 8

| N | h |
|---|---|
| 0 | 0.000–0.436 |
| 1 | 0.436–0.689 |
| 2 | 0.689–0.833 |
| 3 | 0.833–0.936 |
| 4 | 0.936–1.017 |
| 5 | 1.017–1.085 |
| 6 | 1.085–1.143 |
| 7 | 1.143–1.195 |
| 8 | 1.195–1.241 |
| 9 | 1.241–1.283 |
| 10 | 1.283–1.322 |
| 11 | 1.322–1.358 |
| 12 | 1.358–1.391 |
| 13 | 1.391–1.422 |
| 14 | 1.422–1.452 |
| 15 | 1.452–1.480 |
| 16 | 1.480–1.500 |

TABLE 9

| | Surface #1 | Surface #2 |
|---|---|---|
| K | −0.4400 | 0.0000 |
| A4 | −0.2560 × 10⁻² | 0.1882 × 10⁻¹ |
| A6 | −0.8470 × 10⁻³ | −0.5235 × 10⁻² |
| A8 | 0.8800 × 10⁻⁴ | 0.3275 × 10⁻³ |
| A10 | −0.7500 × 10⁻⁵ | 0.3235 × 10⁻⁴ |
| A12 | −0.6200 × 10⁻⁵ | 0.0000 |

The diffractive lens structure 51 is a diffractive lens whose blazed wavelength is 715 nm. An additional optical path length added by a phase grating structure is expressed by the following optical path difference function Φ(h):

$$\Phi(h) = (P_2 h^2 + P_4 h^4 + P_6 h^6 + \ldots) \times \lambda$$

where $P_2$, $P_4$ and $P_6$ are coefficients of second, fourth and sixth orders, h is a height from the optical axis and λ is a design wavelength.

The function Φ(h) represents an optical path difference between an imaginary ray that is assumed not to be diffracted by the grating and a ray that is diffracted by the grating, at a point on the phase grating structure where the height from the optical axis is h.

An actual microscopic shape of the phase grating structure is defined like a Fresnel lens having a large number of concentric rings. The actual shape Φ'(h) is defined by subtracting λ×m (m: integer) from Φ(h) as follows.

$$\Phi'(h) = (\text{MOD}(P_2 h^2 + P_4 h^4 + \ldots + C, 1) - C) \times \lambda$$

Symbol C is a constant defining a phase at a boundary between adjacent rings (0=C<1). The function MOD(x, y) represents the remainder when x is divided by y. MOD($P_2 h^2 + P_4 h^4 + \ldots + C$, 1) is equal to zero at the boundary. The phase grating structure is formed on the base curve that is the lens surface of the refractive lens. Inclines and steps of the ring areas are designed such that the optical path differences are defined by Φ'(h).

TABLE 10 indicates respective coefficients of second, fourth, sixth, eighth and tenth orders $P_2$, $P_4$, $P_6$, $P_8$ and $P_{10}$ of the optical path difference function Φ(h) to define the diffractive lens structure 51.

TABLE 10

| | |
|---|---|
| P2 | −2.3272 |
| P4 | −1.5269 |
| P6 | −5.5184 × 10⁻¹ |
| P8 | 1.5292 × 10⁻¹ |
| P10 | −1.6178 × 10⁻² |

Further, the incident surfaces of the rings of which number N is 0 through 16 are defined by substituting the curvature $C_N$, the conic constant $K_N$ and the coefficients $A_{4N}$ through $A_{12N}$ and $\Delta_N$ shown in TABLE 11 in the following aspherical formula.

$$X(h) = \frac{h^2 C_N}{1 + \sqrt{1 - (1 + K_N) h^2 C_N^2}} + A_{4N} h^4 + A_{6N} h^6 + A_{8N} h^8 + A_{10N} h^{10} + A_{12N} h^{12} + \Delta_N$$

TABLE 11

| | |
|---|---|
| rN = | 2.08970 + 0.000467 × N |
| κN = | −0.4400 |
| A4N = | −7.000 × 10⁻⁴ + 1.5625 × 10⁻⁶ × N |
| A6N = | 1.000 × 10⁻⁵ |
| A8N = | −1.700 × 10⁻⁴ |
| A10N = | 5.100 × 10⁻⁵ |
| A12N = | −1.280 × 10⁻⁵ + 1.8750 × 10⁻⁸ × N |
| ΔN = | −0.001328 × N |

The duty ratio of the transmittance controlling phase grating 52, which is composed of the rings whose number N is larger than 17, may be designed as the same manner in the first example. The minimum width of the ring should be larger than 10 μm. The recessed surfaces and the protuberant surfaces are included in the respective aspherical surfaces that are defined in TABLE 12.

TABLE 12

| | Protuberant Surface | Hollow Surface |
|---|---|---|
| r | 2.09778 | 2.09903 |
| K | −0.440 | −0.440 |
| A4 | −8.750 × 10⁻⁴ | −8.730 × 10⁻⁴ |
| A6 | −1.260 × 10⁻⁴ | −1.260 × 10⁻⁴ |
| A8 | −6.230 × 10⁻⁵ | −6.170 × 10⁻⁵ |
| A10 | 6.700 × 10⁻⁶ | 6.670 × 10⁻⁶ |
| A12 | −6.230 × 10⁻⁶ | −6.200 × 10⁻⁶ |
| Δ | −0.015624 | −0.019230 |

The transmittance controlling phase grating can be formed not only on the objective lens as the above described examples, but also on a separate element such as a flat plate arranged adjacent to the objective lens. In such a case, the phase grating can be formed by lithography, which eases to form sharp edges of the grooves. Further, when the transmittance controlling phase grating is formed on the flat plate, the diffractive light whose diffractive order is not zero is cut off by the pupil of the objective lens or the like, which reduces the noise laser beam that goes back to the photodetector.

The present disclosure relates to the subject matter contained in Japanese Patent Application No. HEI 11-060809, filed on Mar. 8, 1999, which is expressly incorporated herein by reference in its entirety.

What is claimed is:

1. An optical system of an optical pick-up that is capable of using at least two types of optical discs having different recording density, said optical system comprising:

a light source portion for selectively emitting a first laser beam having a first wavelength and a second laser beam having a second wavelength, wherein said second wavelength is longer than said first wavelength; and an objective lens for converging said laser beam from said light source portion onto an recording layer of said optical disc, said objective lens being provided with a transmittance controlling phase grating in a peripheral region that is outside of the transmitting region of the laser beam having a predetermined NA required for said optical disk having lower recording density, wherein said transmittance controlling phase grating is formed as a plurality of concentric ring-shaped grooves to have a wavelength dependence such that the transmittance for said first laser beam is higher than the transmittance for said second laser beam, and wherein each of said grooves has a rectangular cross-section in a plane containing an optical axis of said objective lens, side walls of said grooves are substantially parallel to said optical axis, recessed surfaces of said grooves and protuberant surfaces between said grooves are substantially coincident with the macroscopic shape of said lens surface, respectively.

2. The optical system according to claim 1, wherein said transmittance controlling phase grating gives optical path difference that is equal to "p" times (p being an integer) of the wavelength of said first laser beam and that is equal to "q+0.5" times (q being an integer) of the wavelength of said second laser beam.

3. The optical system according to claim 2 wherein said magnifications "p" and "q" satisfy p=3 and q=2.

4. The optical system according to claim 1, wherein said first and second laser beams satisfy the following condition (1);

$$0.81 < \lambda 1/\lambda 2 < 0.85 \qquad (1)$$

where $\lambda 1$ is the wavelength of said first laser beam, and $\lambda 2$ is the wavelength of said second laser beam.

5. The optical system according to claim 1, wherein said transmittance controlling phase grating satisfies one of the following conditions (2) and (3) in at least one pair of said recessed surface and the adjacent protuberant surface;

$$1.2 < R1R2 < 3.0 \quad (2)$$

$$1.2 < R2R1 < 3.0 \quad (3)$$

where R1 is a width of said recessed surface and R2 is a width of the adjacent protuberant surface in a radial direction of said objective lens.

6. The optical system according to claim 1, wherein a ratio R1/R2 varies depending on a position in a radial direction in said peripheral region, where R1 is a width of said recessed surface and R2 is a width of the adjacent protuberant surface in a radial direction of said objective lens.

7. The optical system according to claim 6, wherein an absolute difference |R1−R2| decreases towards the outer side from the inner side in said peripheral region.

8. The optical system according to claim 6, wherein said transmittance controlling phase grating satisfies R1<R2 in at least one pair of said recessed surface and the adjacent protuberant surface.

9. The optical system according to claim 1, wherein a central region inside said peripheral region is a continuous surface whose cross section along the radial direction is a single curve, and wherein said light source portion selectively emits said first and second beams such that said first laser beam is incident on said objective lens as a parallel beam and said second laser beam is incident on said objective lens as a divergent beam.

10. The optical system according to claim 1, wherein a diffractive lens structure is formed in a central region inside said peripheral region, said diffractive lens structure is formed as a plurality of concentric rings each of which has a wedge cross section to have wavelength dependence such that spherical aberration varies in the undercorrected direction as wavelength of incident light increases, and wherein said light source portion selectively emits said first and second beams such that said first and second laser beams are incident on said objective lens as parallel beams.

11. An objective lens for an optical system of an optical pick-up, comprising:
a refractive lens element having positive power; and
a phase grating formed solely on an outer peripheral portion of an effective area of one lens surface of said objective lens element, said phase grating configured for controlling transmittance of light passing through said outer peripheral portion so that light having a first wavelength has a higher transmittance through said outer peripheral portion than light having a second wavelength which is longer than said first wavelength.

* * * * *